United States Patent [19]
Boezeman et al.

[11] Patent Number: 6,091,427
[45] Date of Patent: Jul. 18, 2000

[54] METHOD AND SYSTEM FOR A TRUE-SCALE MOTION PATH EDITOR USING TIME SEGMENTS, DURATION AND SYNCHRONIZATION

[75] Inventors: John J. Boezeman, Cary; Christopher Joseph Paul, Durham, both of N.C.

[73] Assignee: International Business Machines Corp., Armonk, N.Y.

[21] Appl. No.: 08/896,648

[22] Filed: Jul. 18, 1997

[51] Int. Cl.[7] .................................................. G06T 13/00
[52] U.S. Cl. ........................ 345/474; 345/473; 345/328
[58] Field of Search ................... 345/473–475, 345/328, 348–349, 333, 418, 425, 427, 302, 340, 342, 433; 382/232, 300

[56] References Cited

U.S. PATENT DOCUMENTS

| | | | |
|---|---|---|---|
| 3,637,212 | 1/1972 | Hurley | 273/85 |
| 5,261,041 | 11/1993 | Susman | 395/152 |
| 5,355,314 | 10/1994 | Feigenbaum | 364/420 |
| 5,425,139 | 6/1995 | William et al. | 395/152 |
| 5,510,995 | 4/1996 | Oliver | 364/474.24 |
| 5,572,639 | 11/1996 | Gantt | 395/133 |
| 5,577,185 | 11/1996 | Tunnell et al. | 395/173 |
| 5,592,602 | 1/1997 | Edmunds et al. | 345/474 |
| 5,594,856 | 1/1997 | Girard | 395/173 |
| 5,619,628 | 4/1997 | Fujita et al. | 345/427 |
| 5,644,486 | 7/1997 | Chang et al. | 364/132 |
| 5,678,001 | 10/1997 | Nagel et al. | 395/173 |
| 5,680,619 | 10/1997 | Gudmundson et al. | 395/701 |
| 5,692,144 | 11/1997 | Thrush | 395/339 |
| 5,758,093 | 5/1998 | Boezeman et al. | 345/302 X |
| 5,758,180 | 5/1998 | Duffy et al. | 395/806 |
| 5,767,861 | 6/1998 | Kimura | 345/473 |
| 5,793,382 | 8/1998 | Yerazunis et al. | 345/474 |
| 5,818,462 | 10/1998 | Marks et al. | 345/473 |
| 5,889,514 | 3/1999 | Boezeman et al. | 345/302 |
| 5,889,519 | 3/1999 | Boezeman et al. | 345/340 |
| 5,929,867 | 7/1999 | Herbstman et al. | 345/474 |
| 5,943,056 | 8/1999 | Sato et al. | 345/419 |

FOREIGN PATENT DOCUMENTS

| | | |
|---|---|---|
| 0309373A2 | 3/1989 | European Pat. Off. . |
| 0709771A1 | 5/1996 | European Pat. Off. . |
| 2258790A | 2/1993 | United Kingdom . |
| 2303282A | 2/1997 | United Kingdom . |

OTHER PUBLICATIONS

Animated Software Documentation, *IBM Technical Disclosure Bulletin*, vol. 34, No. 10A, pp. 27–28 (Mar. 1992).
Tutorial 12: Curves and Controllers, *3–D Studio Max Tutorials*, Autodesk, Inc., pp. 12–19 to 12–26 (Mar. 1996).
Chapter 19: Shaping Objects, *Corel Draw4 User Manual*, Corel Corporation, p. 118 (1993).

*Primary Examiner*—Mark R. Powell
*Assistant Examiner*—Chante' Harrison
*Attorney, Agent, or Firm*—A. Bruce Clay; Myers, Bigel, Sibley & Sajovec, P.A.

[57] ABSTRACT

Segments of a motion path are assigned a time factor and the motion path a total time factor. The time factor for each segment may be a percentage of the total time factor or a number of clock ticks. Once the total time factor is assigned, the remain segment time factors can be dynamically created therefrom. If the segment time factors are created before assigning a value to the total time factor, the total time factor will be a sum of the segment time factors.

21 Claims, 18 Drawing Sheets

METHOD AND SYSTEM FOR A TRUE-SCALE MOTION PATH EDITOR USING TIME SEGMENTS, DURATION AND SYNCHRONIZATION

CROSS REFERENCE TO RELATED APPLICATIONS

This Application is related in subject matter to the following Applications filed concurrently herewith and assigned to a common Assignee:

application Ser. No. 08/896,817 filed by Boezeman, et al., entitled "Method and System for a True-Scale Motion Path Editor" (IBM Docket No. CR9-97-011); application Ser. No. 08/896,815 filed by Boezeman, et al., entitled "Method and System for a True-Scale Motion Path Editor to Create Motion Paths as Independent Entities" (IBM Docket No. CR9-97-028); and application Ser. No. 08/896,818 filed by Boezeman, et al., entitled "Method and System for a True-Scale Motion Path Editor Using Proximity Detection/Reaction and Event Generation" (IBM Docket No. CR9-97-082).

The foregoing co-pending Applications are incorporated herein by reference.

FIELD OF THE INVENTION

This invention relates in general to computer software, and in particular to a method and system for defining the movement path of a multimedia object in an application development environment using time segments and duration.

BACKGROUND OF THE INVENTION

In a multimedia application development environment, users often want to assign a path along which a part will move to give the application special effects. For example, a user might want to display an animation of a bird appearing on the left edge of a page and flying across the page to exit on the right side of the page. Using the known techniques, the assignment of a motion path to a part is tedious. In addition, the known techniques have limited flexibility and require construction separate from the part layout area. Once constructed, it is difficult to modify the path.

One type of path definition is found in, for example, Premier by Adobe. To construct a path for an object/part, the part must be taken from the layout area and placed in a separate window. Then, the user can draw a path for the part using a pointing device. There is no one-to-one scale and the path is drawn without the perspective of the actual environment including lack of surrounding parts at actual size. Thus, the user must create the path and then assign it, return to the layout area and run a test. If the path does not look right, the user must return to the separate path definition window and try again. This is awkward and time consuming, especially in complex layouts.

Another type of path definition can be found in Director by Macromedia. This type of path definition allows the use of the actual layout area for construction but also requires the use of a "score" area. The user must set a start time in the score for the part. Then the user must drag the part to the next movement position in the layout area followed by another setting in the score area for the time it should appear in that position. Once these steps have occurred from start point to finish point, the score area is highlighted and the placement is made on the layout area. Thus, this method can also be slow and tedious.

The currently known time and duration specification methods available for motion paths ignores movement synchronization entirely. There is currently no reliable method for automatically synchronizing two or more objects traveling along separate motion paths. Additionally, current time and duration specification methods are not flexible enough to allow the creation of complex time-based dependencies within paths and between multiple paths.

Thus, there is a need for a method and system for path definition that is quick, easy, flexible and uses time segments, duration, and synchronization.

SUMMARY OF THE INVENTION

The present invention disclosed herein comprises a method and system for defining duration of segments of a motion path which substantially eliminates problems associated with prior motion path editors. The present invention allows dynamic setting of time durations for both the entire motion path and the individual segments.

In accordance with one aspect of the present invention, segments of a motion path are assigned a time factor and the motion path a total time factor. The time factor for each segment may be a percentage of the total time factor or a number of clock ticks. Once the total time factor is assigned, the remain segment time factors can be dynamically created therefrom. If the segment time factors are created before assigning a value to the total time factor, the total time factor will be a sum of the segment time factors.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
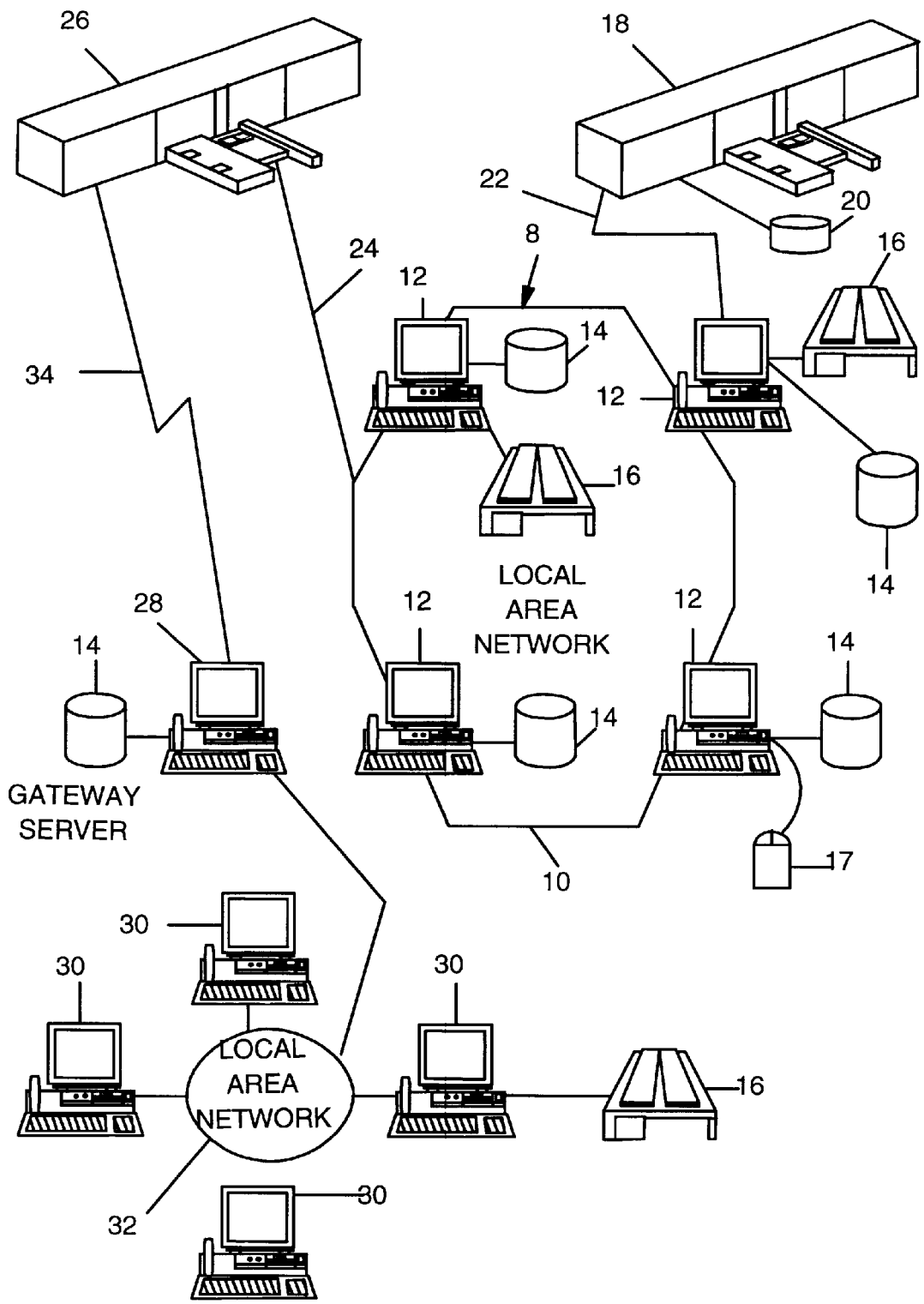
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
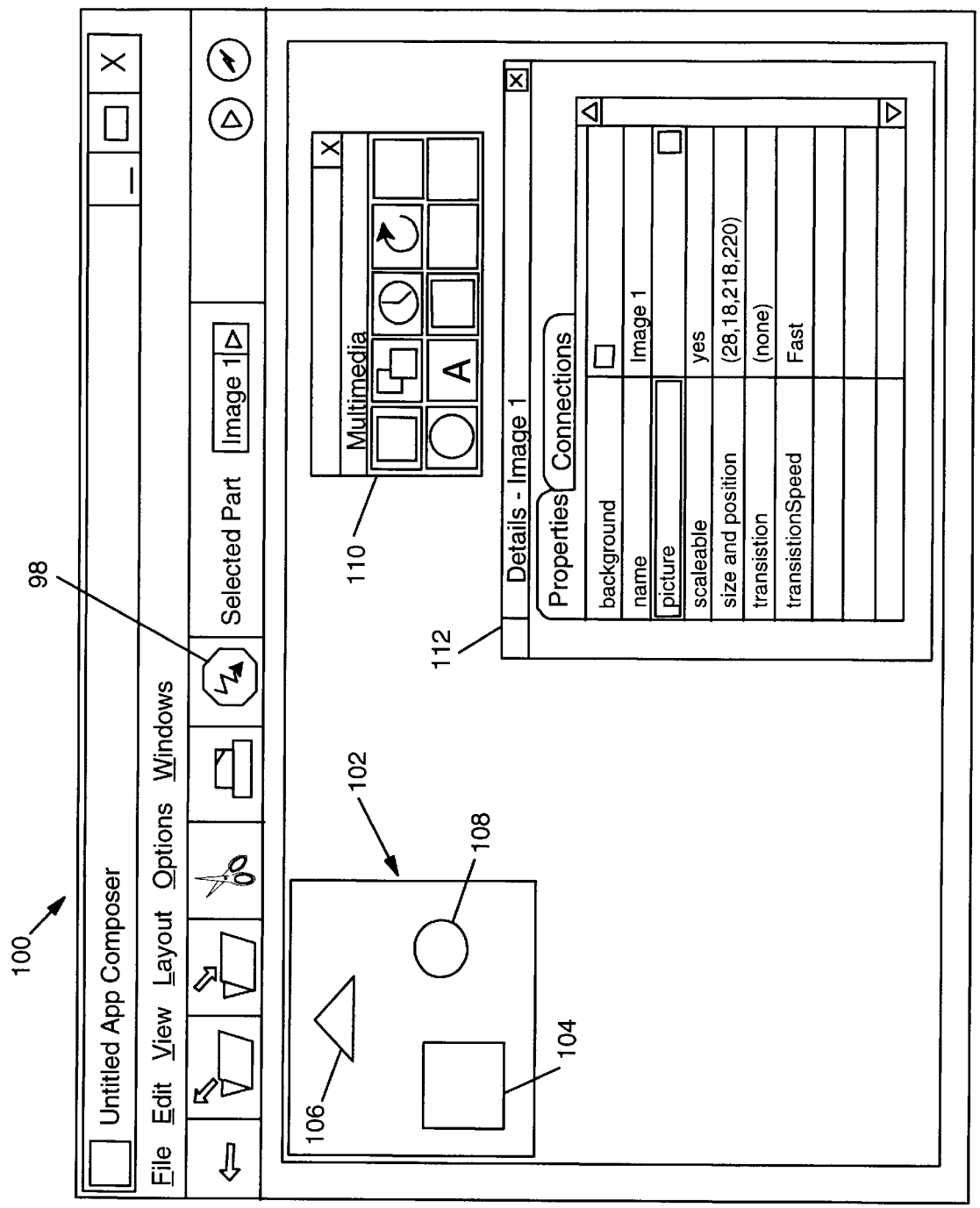
FIG. 2 is a graphical representation of a multimedia parts editor.

Referring to FIG. 2, a graphical representation of a multimedia part editor is shown in window 100. Within the part editor 100 there appears a layout area, generally indicated by reference numeral 102, in which a plurality of multimedia objects/parts, for example, square 104, triangle 106 and circle 108, are positioned for manipulation. A palette window 110 and a Details window 112 are also provided. The palette window 110 contains a collection of parts available for use in the current application being developed. These may include multimedia parts(image, sound, animation, etc) and/or controls (buttons, labels, list boxes, etc).

The Details window 112 is used to modify and customize the specific parts used in the current application and add logic between parts. A Properties tab 113 in the Details window 112 provides a method to modify the parts by allowing the user to customize specific characteristics of parts in the current application. For example, the picture property of an image part can be any source file (in the correct format) that the user desires. A Connections tab 115 of the Details window 112 provides a method to add logic between parts in the "part, event—part, action/property" format. For example, a user can add logic between a button and a sound file so that when the button is clicked, the sound file will play. This connection would read: "button clicked—sound play".

Figure 3:
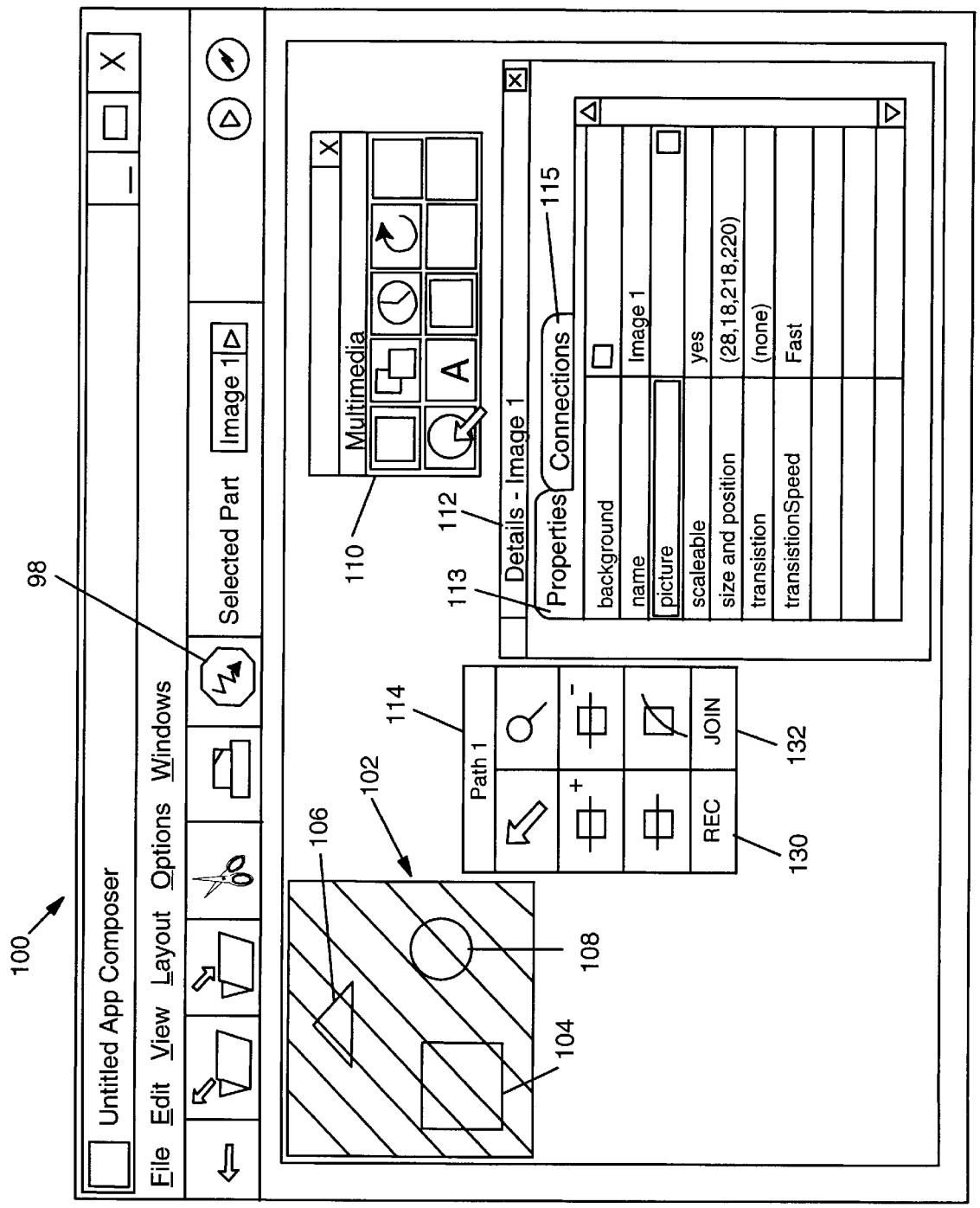
FIGS. 3, 4 and 5 are graphical representations of the multimedia editor of FIG. 2 utilizing a path editor in accordance with the present invention.

Referring to FIG. 3, upon pressing a motion path button 98 on a main toolbar or by selecting "Motion Path Editor" (not shown) via an appropriate menu choice, a path editor window 114 appears adjacent to the layout area 102. A part specific path can also be created by first selecting a part to apply the path to and then pressing the motion path button 98 on the main toolbar or by selecting "Motion Path Editor" via the appropriate menu choice. The path window 114 is provided with a plurality of buttons and tools (which will be subsequently described in greater detail), including a "Record" push-button 130 and a "Join" push-button 132. In addition, all the parts/images within the layout area 102 are slightly ghosted when the motion path window 114 is first displayed, as indicated by the diagonal lines appearing therethrough.

Figure 4:
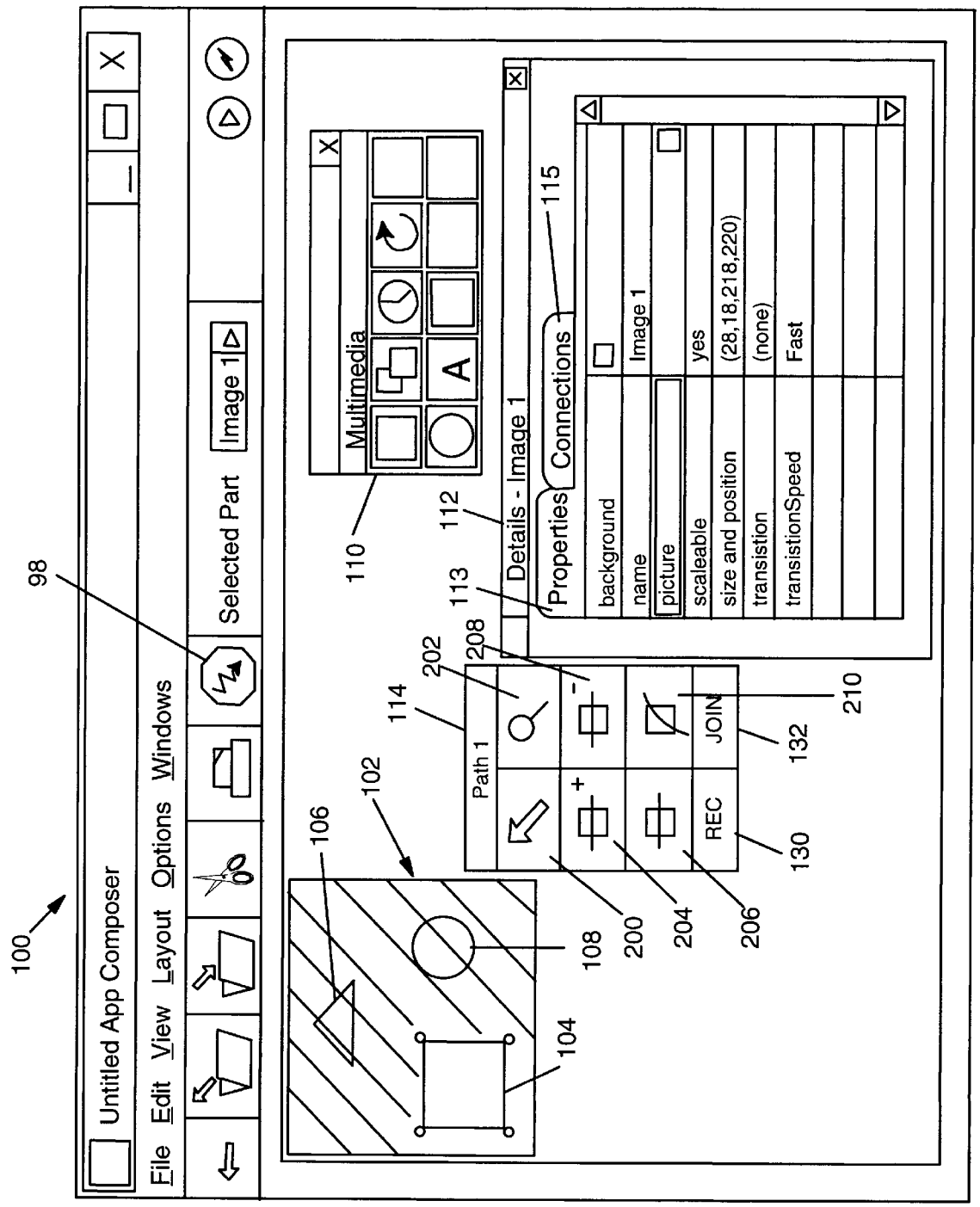

Referring to FIG. 4, the user has selected an object, for example, the square 104, to which a path will be assigned. As shown in FIG. 4, the square 104 has become unghosted (shown without diagonal lines). There are two methods for creating the motion path for square 104. First, the user can press the record push-button 130, and while holding the mouse button down, drag the square 104 manually in the layout area 102 to define a path. In the second method, the user can manually define individual points along which the square 104 will follow for its path.

Figure 5:
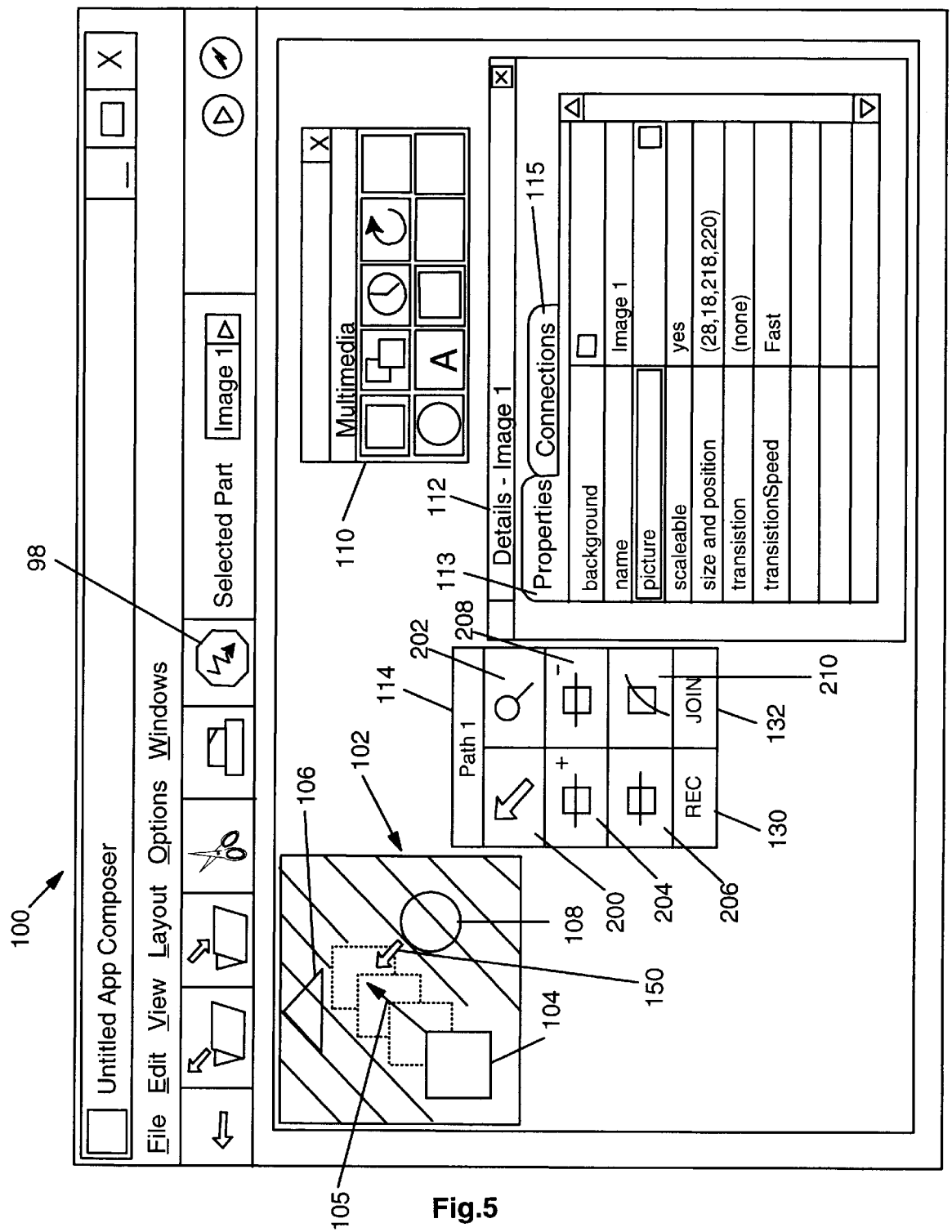

Referring to FIG. 5, an example of the manual drag technique to assign a path is shown. The user presses the Record push-button 130, and then places a cursor 150 over the object to be moved, for example, the square 104, and drags the object along a path (shown as line 105) of the desired movement. When the user has reached the point at which he/she would like the path to end, the user releases the mouse button and the path "record" activity ceases. When set into motion, the square 104 will then move along the path 105 as drawn.

Figure 6:
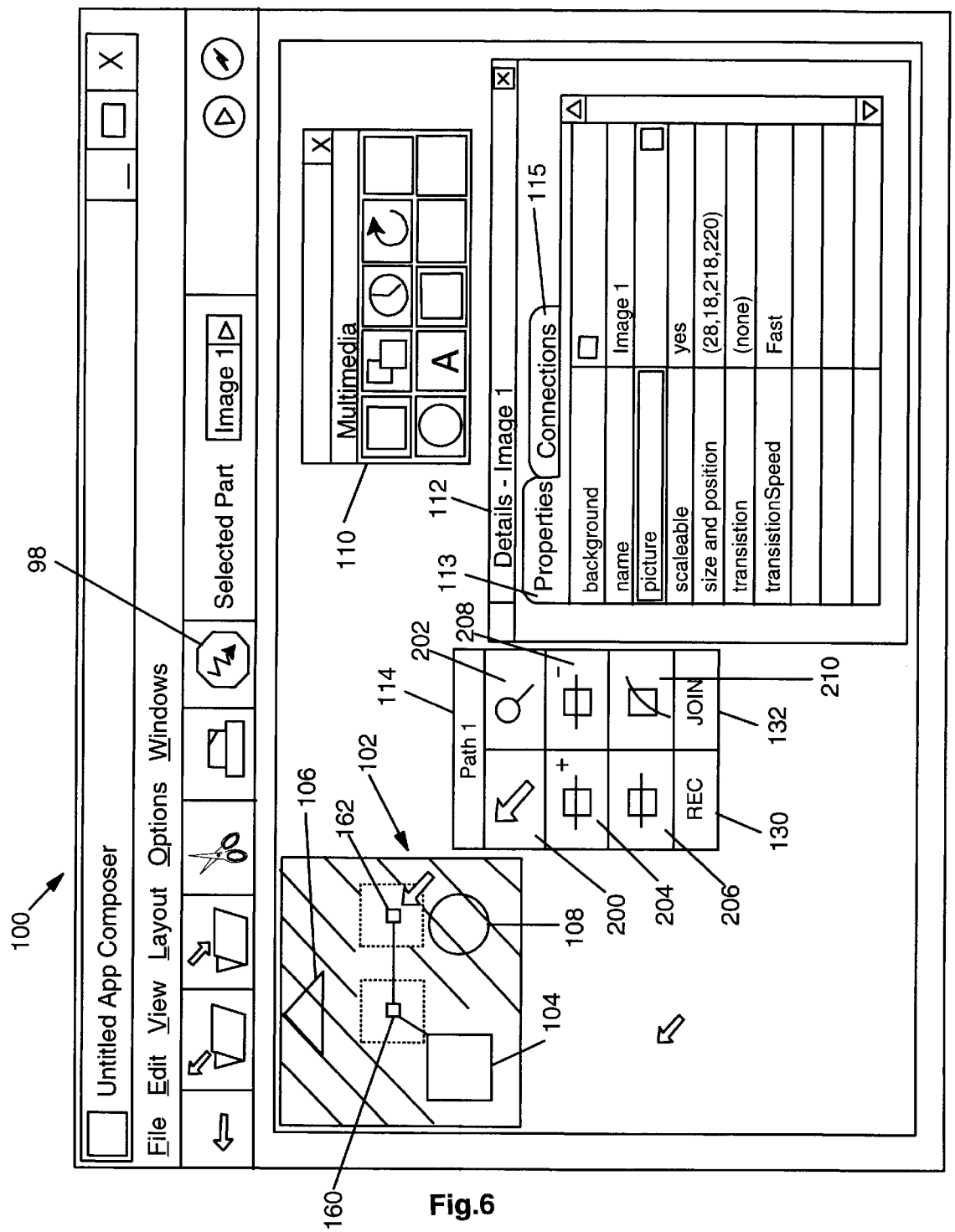
FIG. 6 illustrates a path definition utilizing various anchor points.

Referring to FIG. 6, the setting of anchor points technique is shown. The user can define as many anchor points as desired, for example, anchor point 160 and anchor point 162 with the initial anchor point defined as the physical center (not shown) of the object. A connecting line is automatically drawn between anchor points as each subsequent anchor point is defined. To indicate the end of the path, the user double-clicks the mouse at the location of the end point, this action completes the path. When set in motion, the object (square 104) will then move along the path as defined by the anchor points.

Figure 7:
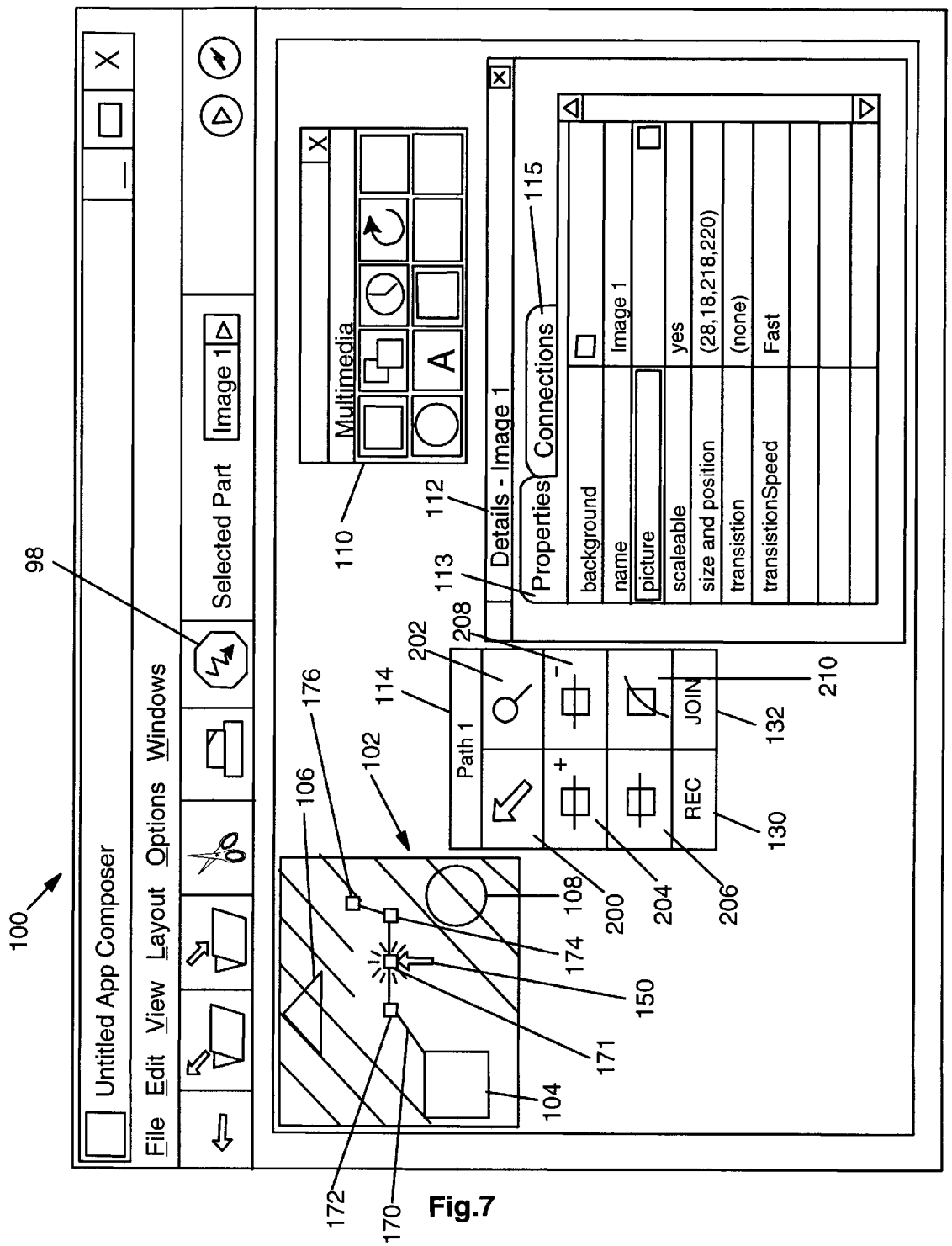
FIG. 7 illustrates adding or deleting an anchor point to a path.

Referring to FIG. 7, having already defined a motion path as identified by line 170 from the square 104 through anchor points 172, 174 and 176, the user decides that the path 170 needs to be modified. To add a point on the path 170, the user selects an anchor point "Add" tool 204 from the path editor window 114 and moves the cursor 150 over the desired location for a new anchor point 171 and presses the mouse button. This adds the new anchor point 171 on the path 170. To delete an existing point from the path 170, the user selects the anchor point "Delete" tool 208 from the path editor window 114, moves the cursor 150 over the existing point to be deleted and presses the mouse button. This deletes the indicated anchor point from the path 170.

Figure 8:
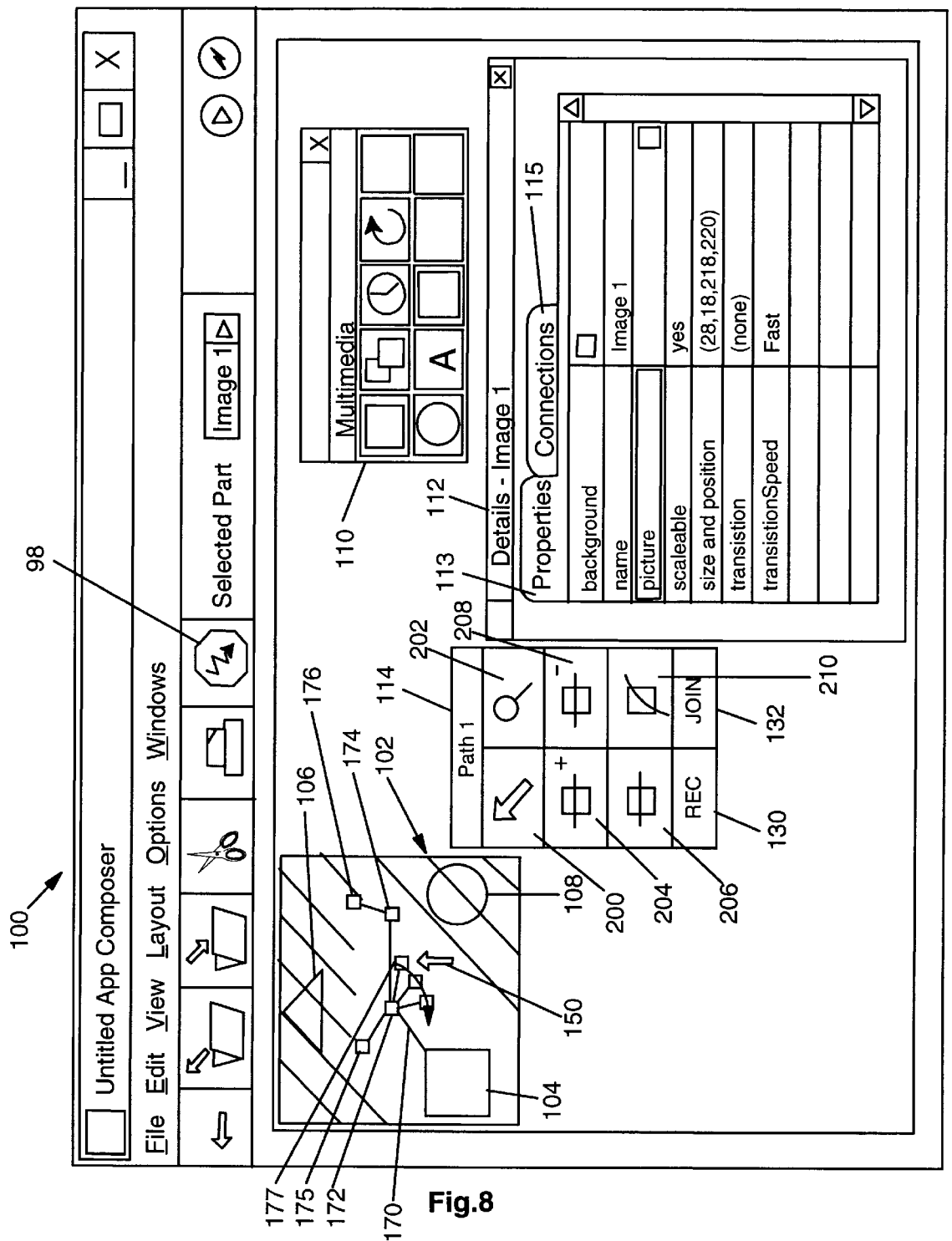
FIG. 8 illustrates defining a curved path.

Referring to FIG. 8, a technique for curving a path is illustrated. The user defines a curve by simply holding and dragging the mouse as the anchor point is being laid, producing an anchor point with two handles 175 and 177 which the user can define and smooth the curve (as shown, handle 177 is dragged "clockwise"). Alternatively, the user can select the anchor point and press an anchor point "curve point" tool 210 in the path editor window 114. Similarly, to make a curve point anchor point into a straight line anchor point, the user can select the curve point anchor point on the layout area 102 and press an anchor point "straight line" tool 206 on the path editor window 114.

Figure 9:
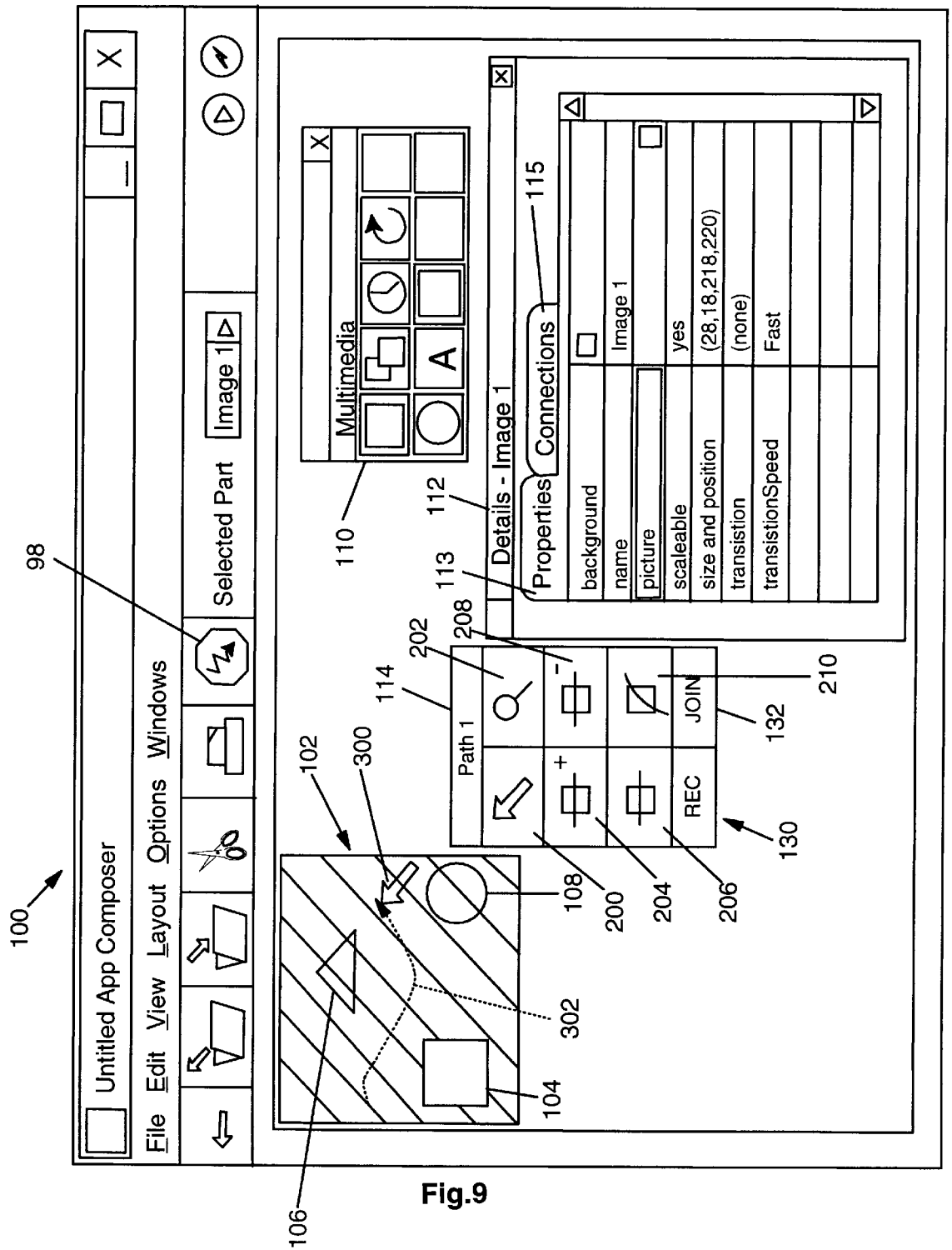
FIG. 9 illustrates joining a predefined and stored path to a newly created path.

Referring to FIG. 9, an independent path entity is created in accordance with the present invention. As previously described above, a user has entered a motion path casing the layout area 102 to be ghosted (shown with diagonal lines). The user then selects Record 130, and using mouse pointer 300, may draw a path 302 in the layout area 102 separate from and independent of any objects therein. Additionally, the path 302 may be created with the use of anchor points, as previously described above. Once created, the path 302 may be saved and assigned to any object/part as desired, by selecting a "Save Path" command (not shown) from an appropriate menu choice and assigning a unique file name.

Figure 10:
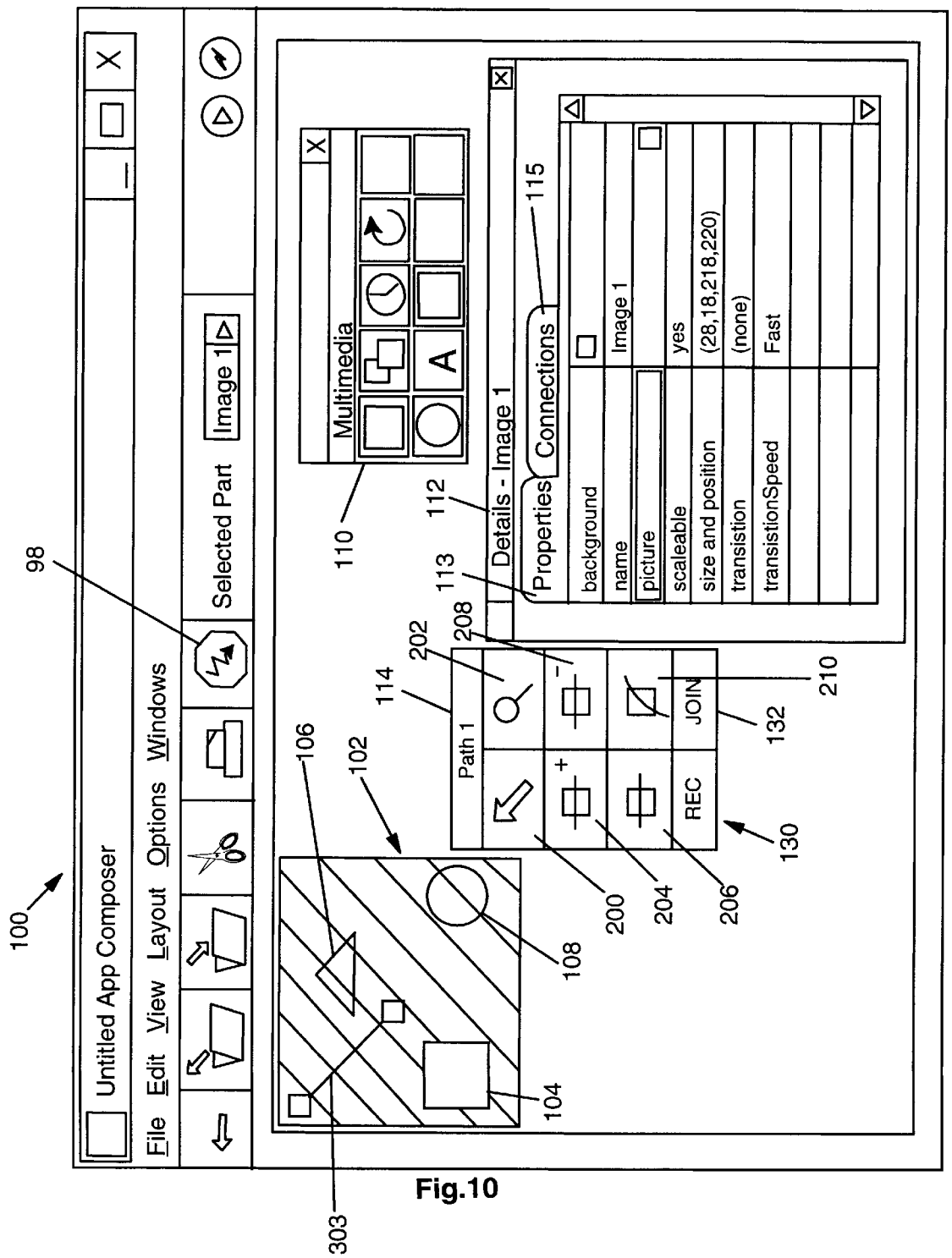
FIG. 10 illustrates a stored path as an independent entity.

Referring to FIG. 10, a path 303 has been saved as an independent entity in accordance with copending application Ser. No. 08/896,815 (IBM Docket CR9-97-028). The path 303 is independent of and separate from any other objects in the layout area 102 and may, therefore, be manipulated separately as any other object.

Figure 11:
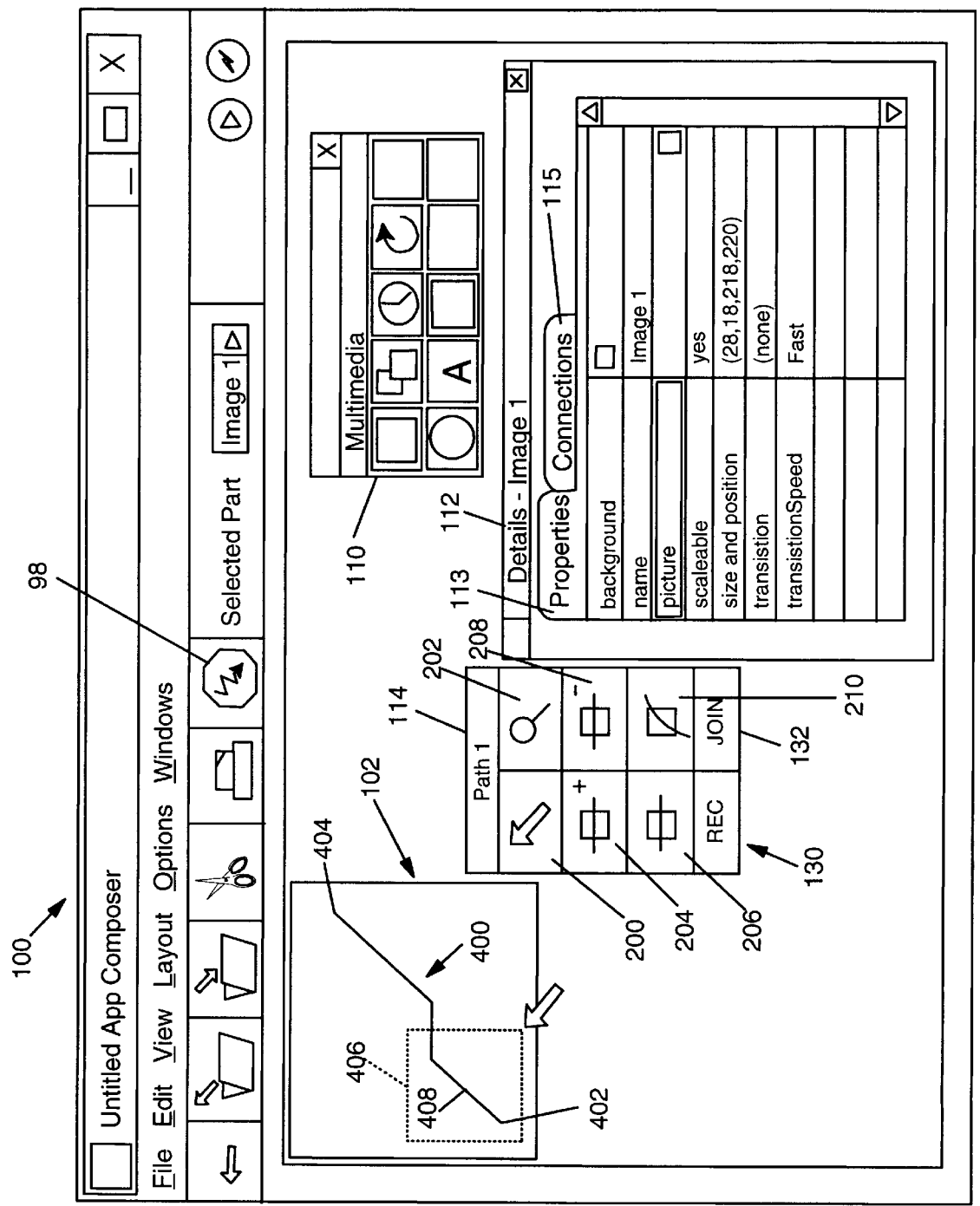
FIG. 11 illustrates selection of a path segment.

The present invention will now be discussed with more particularity by referring to FIGS. 11–18. Referring first to FIG. 11, an independently created path 400 is shown in the layout area 102. The path 400 may or may not have a previously designated time duration for an object (not shown) to travel therealong from a start point 402 to an end point 404. By region selecting (as designated by a dashed box 406) a segment 408 of the path 400, a specific duration for an object to travel therealong may be set.

Figure 12:
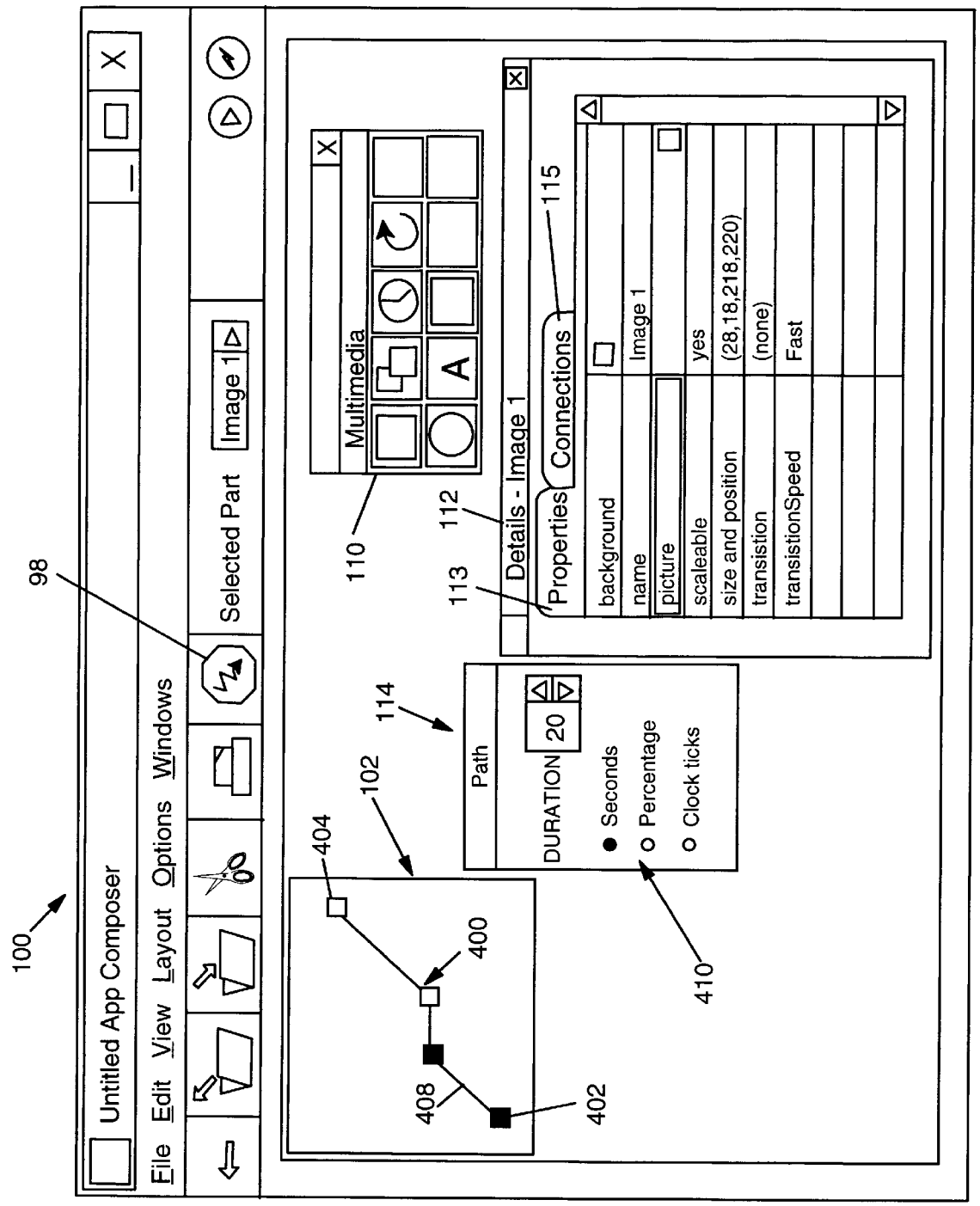
FIG. 12 illustrates setting a segment duration.

Referring to FIG. 12, the segment 408 has been selected and appears in any appropriate manner (highlighting, color change, wider, etc.) to be distinct from the remaining segments of the path 400. In addition, a duration setting entry field, generally indicated by reference numeral 410, appears in the path editor window 114. The developer may then set the duration for the segment 408 by selecting the appropriate choices in the duration setting entry field. For example, the segment 408 has been set to 20 seconds, and, therefore, any object assigned to the path 400 will travel along the segment 408 for 20 seconds. Alternatively, the developer can set the duration of the segment 408 as a percentage of the total time from the start point 402 to the end point 404 or as ticks of a clock.

Figure 13:
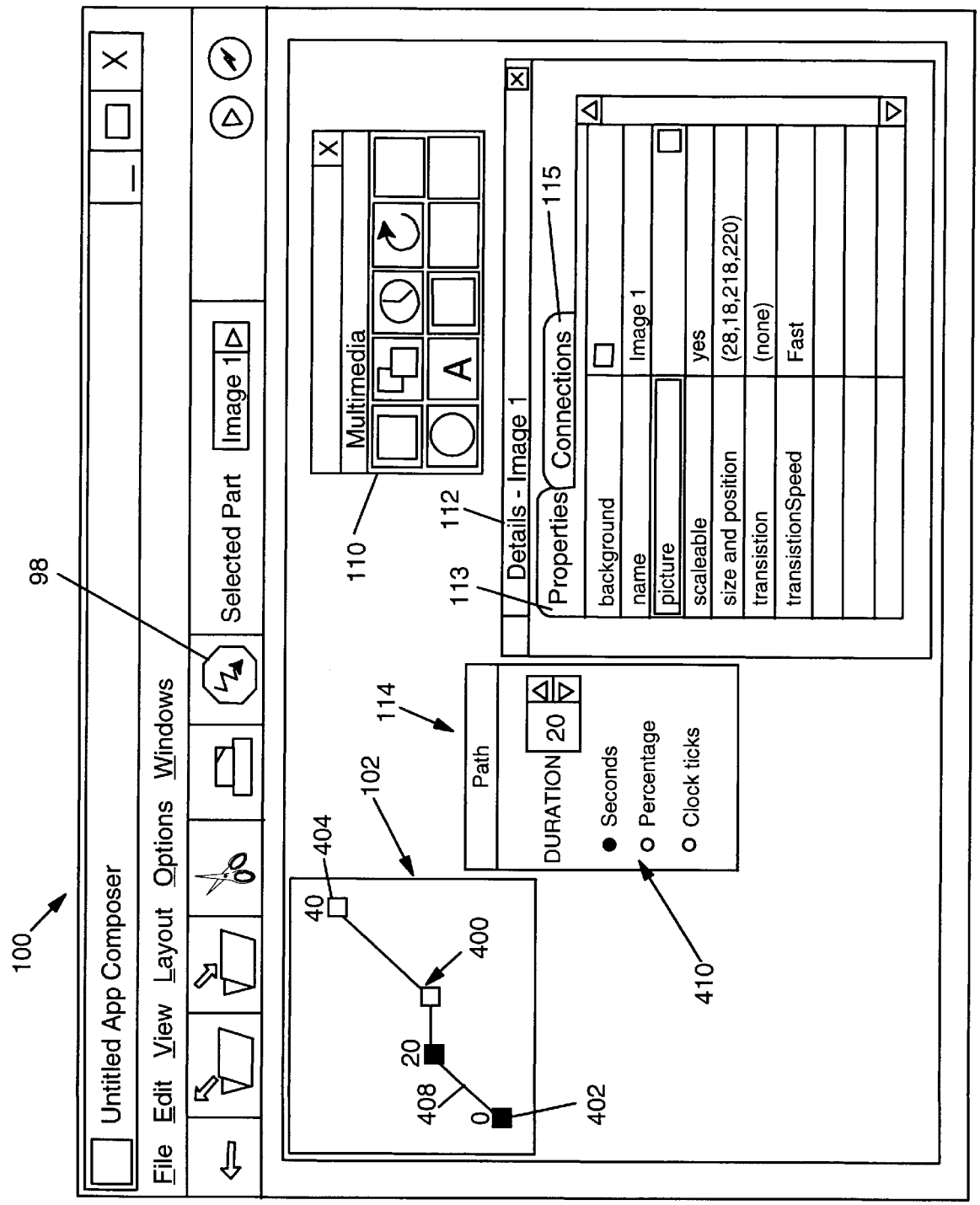
FIG. 13 illustrates the displaying of segment duration.

Referring to FIG. 13, the duration for the path 400 has been previously set to last 40 seconds from the start point 402 to the end point 404. The developer has selected the segment 408 (as previously described above) and entered 20 seconds for the duration thereof. Thus, an object traveling along the path 400 will spend half of its total travel time along the segment 408. Obviously, the duration for the segment 408 can be set to any amount of time less than or equal to the total travel time, and thus, the remaining travel time will be automatically adjusted based thereon. Similarly, the segment could be set to a percentage of the total travel time.

Figure 14:
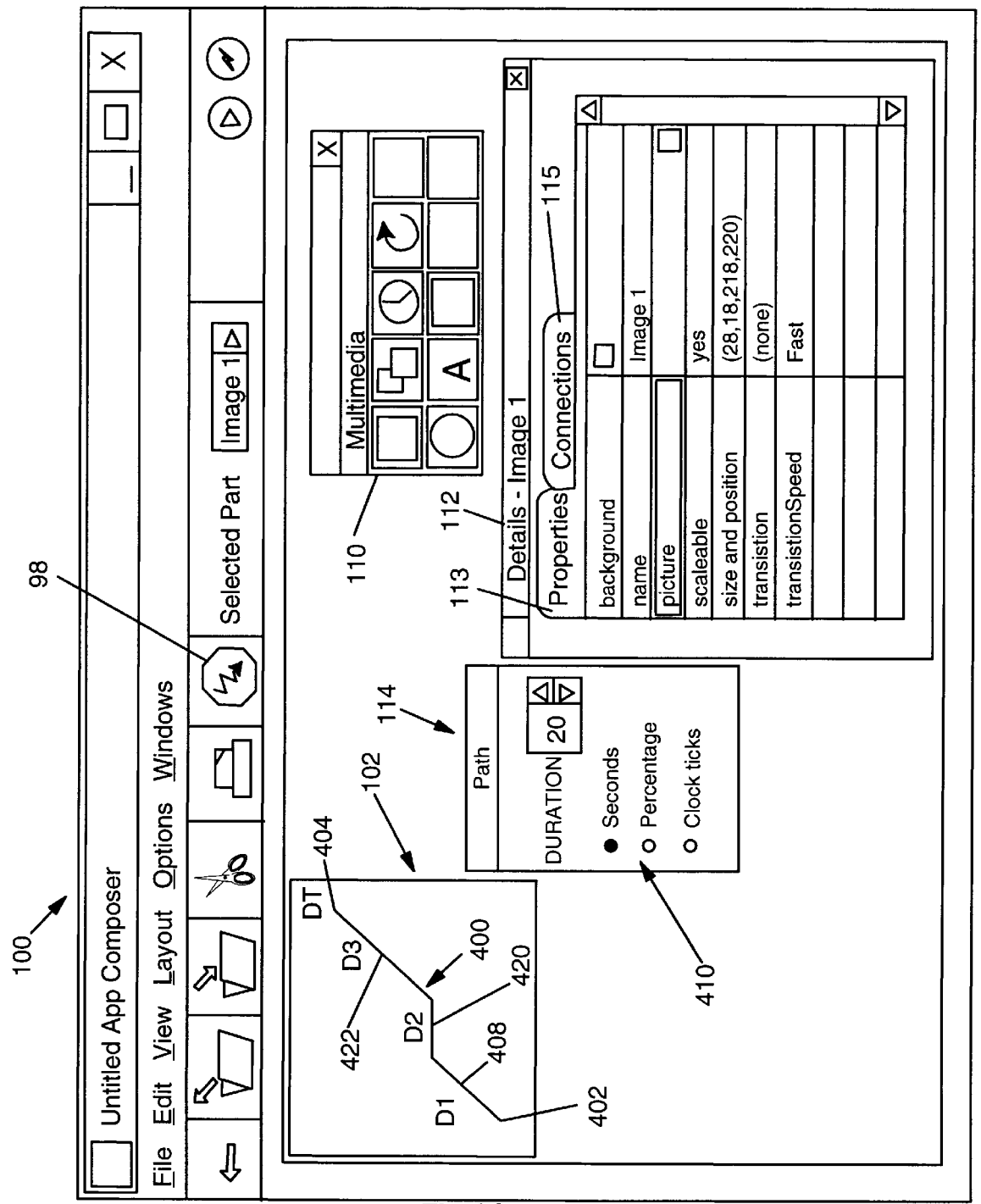
FIGS. 14 and 15 illustrate segment duration to path relationships.

Referring to FIG. 14, if the total duration DT of the entire path 400 is set before the duration (D1, D2 and D3) of the individual segments 408, 420 and 422, respectively, and the developer chooses to define the segment durations in actual time rather than a percentage of total duration, as each segment's duration is defined, the time available for each remaining segment is subtracted from the total duration DT. No segment 408, 420 and/or 422 can be assigned a duration greater than the total duration DT, and the sum of the segment durations D1, D2, and D3 must be equal to or less (if the sum of the segments is less than the total path duration, the part will travel the distance from the last defined point to the path endpoint in the remaining time) than the total duration DT.

If the total duration DT is set before the duration D1, D2, and D3 of the segments 408, 420, and 422, respectively, and the developer chooses to define the segment durations as a percentage of the total duration DT rather than as actual time, as each segment duration is defined, the percentage of time available for each remaining segment is subtracted from the total duration DT, such that: if DT=100 seconds and D1=25%, the time available for D2=DT−25%(DT), and so on. No segment can be assigned a duration greater than 100% of the total duration DT, and the sum of the segment's durations (D1+D2+D3) must be equal to or less than the total duration time DT.

Figure 15:
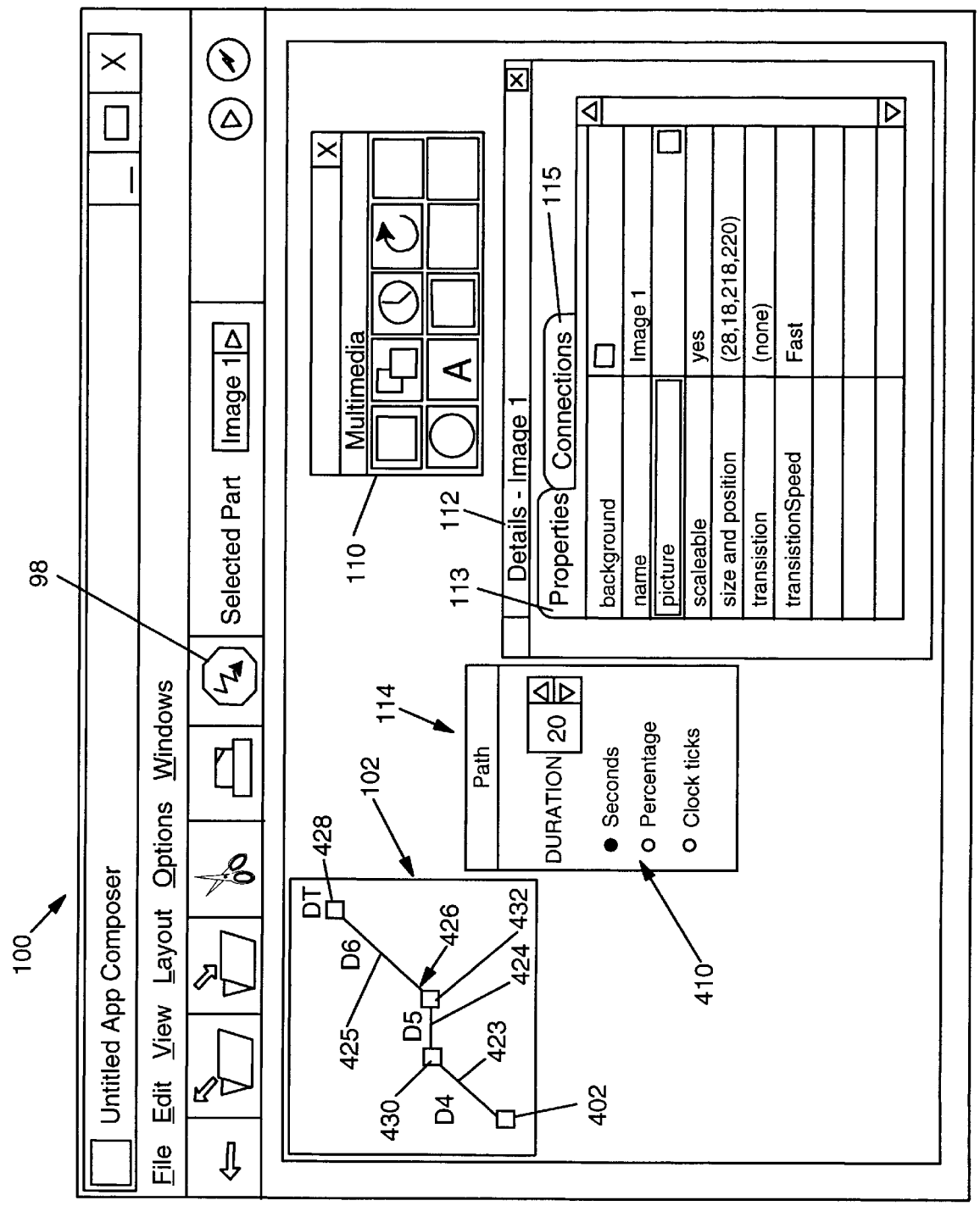

Referring to FIG. 15, if the duration (D4, D5, D6) of the individual segments 423, 424 and 425, respectively, is set before the total duration TD of path 426, and the developer choose to define the segment durations in actual time rather than a percentage of total duration, as each segment's duration is defined, they are summed and the evolving total duration is displayed at the end point (ie., point 428).

If the duration (D4, D5, D6) of the individual segments 423, 424, and 425, respectively, is set before the total duration TD of the path 426, and the developer chooses to define the segment duration as a percentage of the total rather than actual time, as each segment's duration is defined, the percentage is displayed above (not shown in FIG. 15) each anchor point such as, for example, point 430 and point 432. Upon completing the duration for each segment, the developer may then select the entire path and specify its total duration TD in actual time. In this case, the actual time duration assigned to each segment is dynamically adjusted, keeping the relative scale to the total duration TD for the entire path.

Segments without defined durations, as either a percentage of the total or in actual time, are adjusted dynamically in the following manner:

1) If actual time values are used and the total path duration is not defined, the segment(s) without a defined duration is assigned one unit of time;
2) If actual time values are used and the total path duration is defined, the segment(s) without a defined duration is assigned the remaining time available if the sum of the defined segments is less than the total path duration. If no time remains, the segment(s) is assumed to be skipped;
3) If percentages are used to define segment durations, and the total path duration is not defined, the segment(s) without a defined duration is assigned one unit of time. The percentage is calculated and displayed at each anchor point and the total path duration is updated, adding one unit of time per undefined segment; and
4) If percentages are used to define segment durations, and the total path duration is already defined, the segment(s) without a defined duration is assigned the remaining time available, if the sum of the assigned durations are less than 100% of the total time. If no time remains, the segment(s) is assumed to be skipped.

Figure 16:
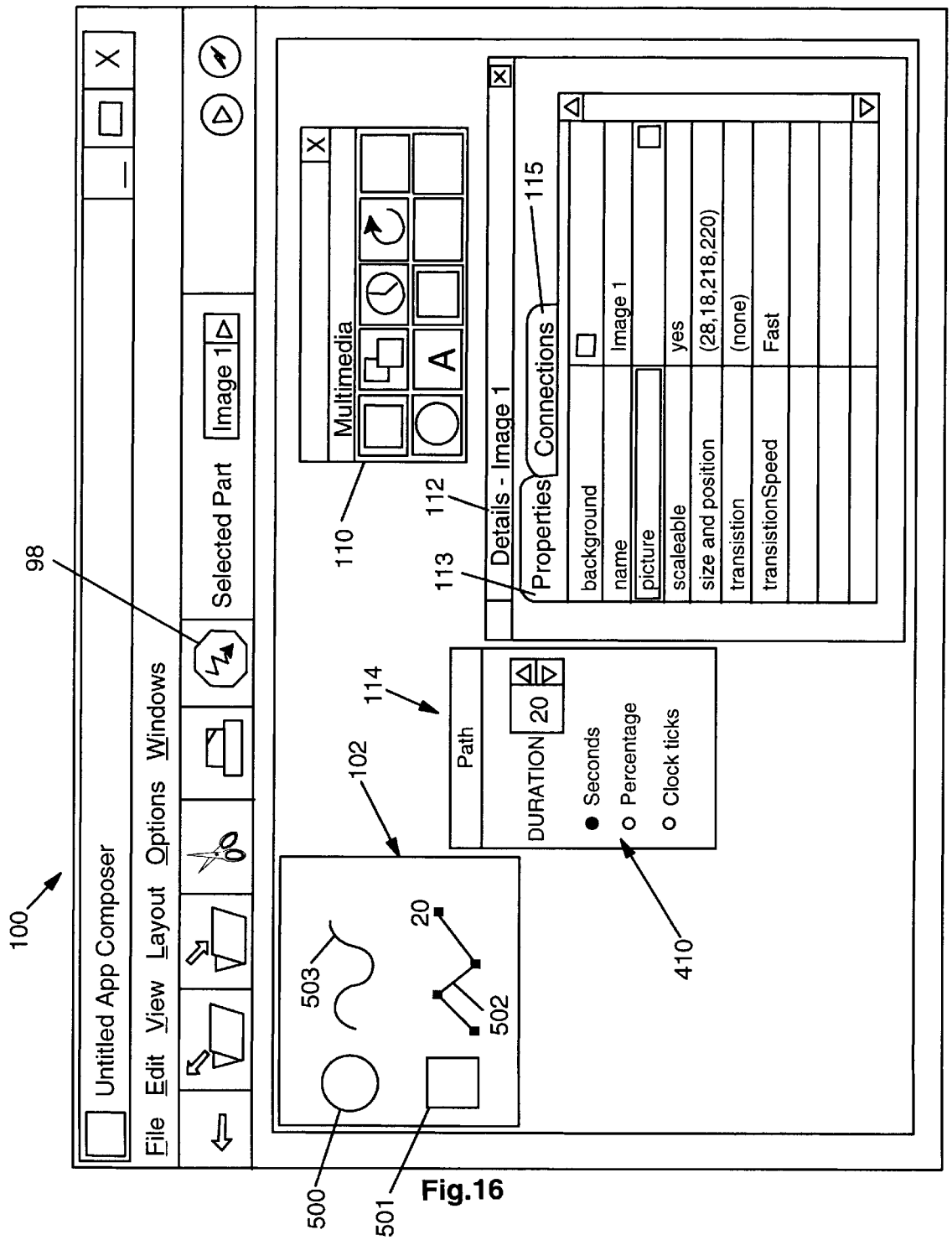
FIGS. 16, 17 and 18 illustrate segment/path synchronization.

Referring to FIG. 16, a motion path 503 for an object 500 and a motion path 502 for an object 501 have already defined using the procedures previously described herein. The developer then selects the entire path 502 and specifies a duration as previously described of 20 seconds. Once the duration of the motion path 502 is defined, the developer can synchronize movement of object 500 along motion path 503 with that of object 501 along path 502.

Figure 17:
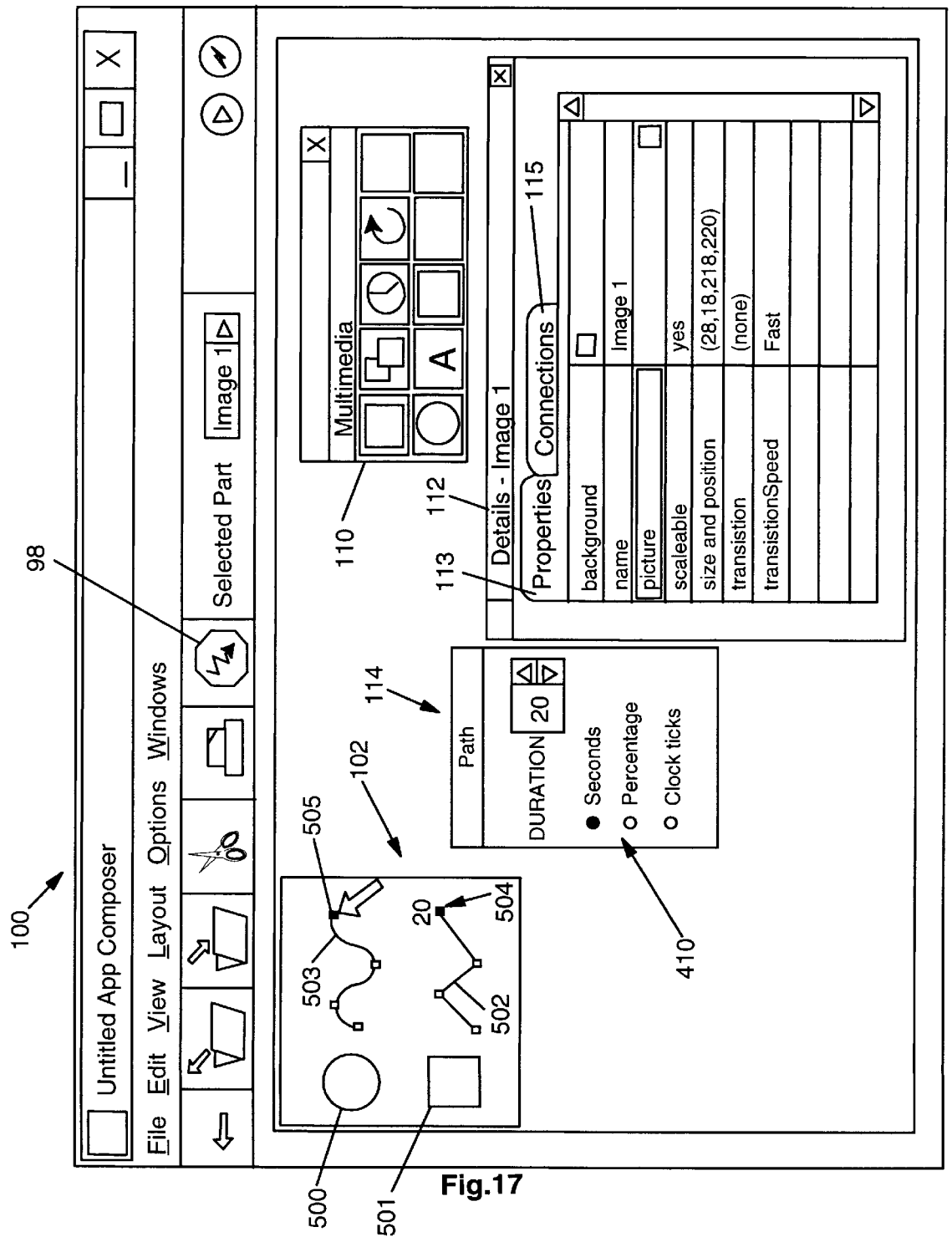
Figure 18:
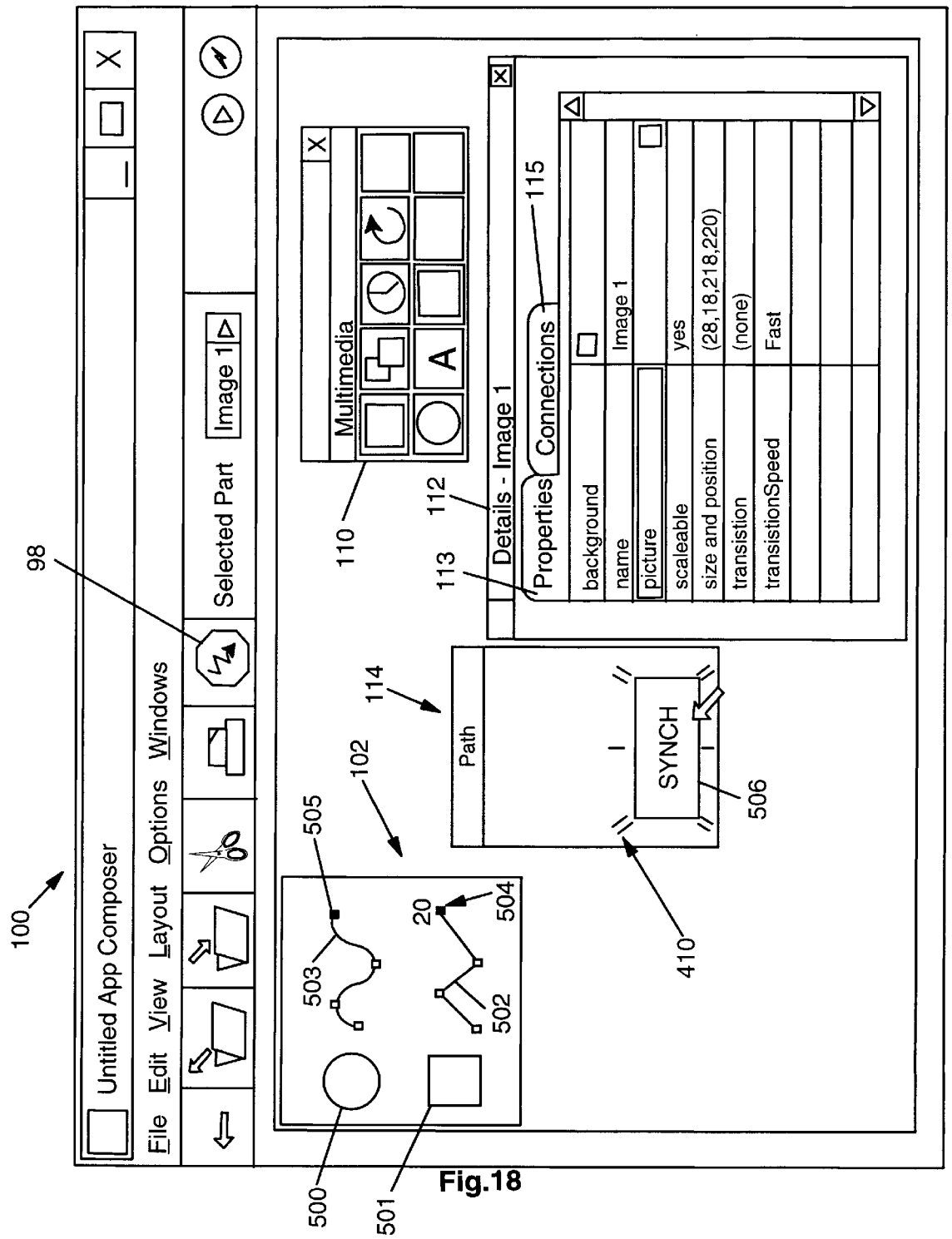

Referring to FIG. 17, to synchronize the movement of the two objects 500 and 501 along their respective paths, the developer selects an anchor point 504 on path 502 (the "master" path) and a desired synchronization point 505 on path 503 (the "slave" path). With the two anchor points 504 and 505 selected, the developer presses a "SYNCH" button 506 (FIG. 18) to synchronize the movement of object 500 along the path 503 with the movement of the object 501 along the path 502. As a result of the synchronization, when object 501 begins to travel along the path 502, the object 500 will match its movement with that of the object 501. Any existing anchor points on a motion path are valid synchronization points.

Thus the present invention offers strong advantages over traditional motion path editors. As described herein, the present invention allows the definition of a true-scale path without requiring the use of a separate path editor dialog. Also provided herein are easy to use methods for path (including curved paths) construction, modification, joining, and using time segments and duration.

Although the present invention has been described with respect to a specific preferred embodiment thereof various changes and modifications may be suggested to one skilled in the art and it is intended that the present invention encompass such changes and modifications as fall within the scope of the appended claims.

What is claimed is:

1. A method of defining durations of segments of a motion path, comprising the steps of:

dividing the motion path into a plurality of segments;

assigning time factors to less than all of the plurality of segments; and dynamically assigning time factors to remaining ones of the segments of the plurality of segments without assigned time factors based on the time factors assigned to the less than all of the plurality of segments wherein at least one of the assigned time factors is different from the time factors assigned to the less than all of the plurality of segments.

2. The method of claim 1, wherein said step of assigning time factors comprises:

assigning percentages of a total time factor to the less than all of the plurality of segments.

3. The method of claim 2, wherein said step of assigning a percentage of said total time factor further comprises:

after assigning said percentage of said total time factor, assigning an actual time duration to said total time factor; and dynamically computing a duration of said at least one of said plurality of segments as an actual time duration based on said percentage of said actual time duration.

4. A method of defining durations of segments of a motion path, comprising the steps of:

dividing the motion path into a plurality of segments;

assigning time factors to less than all of the plurality of segments by assigning a number of clock ticks to said less than all of the plurality of segments; and assigning a total time factor for the motion path.

5. The method of claim 4, wherein said step of assigning at least a first time factor comprises:

after assigning said total time factor, dynamically computing said at least a first time factor based on user assigned percentages of said total time factor.

6. The method of claim 4, wherein said step of assigning at least a first time factor comprises:

after assigning said total time factor an actual time duration, dynamically computing any remaining segment duration times after assigning an actual time duration for said at least one of said plurality of segments.

7. The method of claim 4, wherein said step of assigning at least a first time factor comprises:

after assigning an actual duration of time for said at least a first time factor for said at least one of said plurality of segments, dynamically computing said total time factor as a sum of said plurality of segments.

8. A system for defining durations of segments of a motion path, comprising:

means for dividing the motion path into a plurality of segments;

means for assigning time factors to less than all of the plurality of segments; and means for dynamically assigning time factors to remaining ones of the segments of the plurality of segments without assigned time factors based on the time factors assigned to the less than all of the plurality of segments wherein at least one of the assigned time factors is different from the time factors assigned to the less than all of the plurality of segments.

9. The system of claim 8, wherein said means for assigning time factors comprises:

means for assigning percentages of a total time factor to the less than all of the plurality of segments.

10. The system of claim 9, wherein said means for assigning a percentage of said total time factor further comprises:

after assigning said percentage of said total time factor, means for assigning an actual time duration to said total time factor; and means for dynamically computing a duration of said at least one of said plurality of segments as an actual time duration based on said percentage of said actual time duration.

11. A system for defining durations of segments of a motion path, comprising:

means for dividing the motion path into a plurality of segments;

means for assigning time factors to less than all of the plurality of segments by assigning a number of clock ticks to said less than all of the plurality of segments; and means for assigning a total time factor for the motion path.

12. The system of claim 11, wherein said means for assigning at least a first time factor comprises:

after assigning said total time factor, means for dynamically computing said at least a first time factor based on user assigned percentages of said total time factor.

13. The system of claim 11, wherein said means for assigning at least a first time factor comprises:

after assigning said total time factor an actual time duration, means for dynamically computing any remaining segment duration times after assigning an actual time duration for said at least one of said plurality of segments.

14. The system of claim 11, wherein said means for assigning at least a first time factor comprises:

after assigning an actual duration of time for said at least a first time factor for said at least one of said plurality of segments, means for dynamically computing said total time factor as a sum of said plurality of segments.

15. A computer program product recorded on computer readable medium for defining durations of segments of a motion path, comprising:

computer readable means for dividing the motion path into a plurality of segments;

computer readable means for assigning time factors to less than all of the plurality of segments; and computer readable means for dynamically assigning time factors to remaining ones of the segments of the plurality of segments without assigned time factors based on the time factors assigned to the less than all of the plurality of segments wherein at least one of the assigned time factors is different from the time factors assigned to the less than all of the plurality of segments.

16. The program product of claim 15, wherein said computer readable means for assigning time factors comprises:

computer readable means for assigning percentages of a total time factor to the less than all of the plurality of segments.

17. The program product of claim 16, wherein said computer readable means for assigning a percentage of said total time factor further comprises:

after assigning said percentage of said total time factor, computer readable means for assigning an actual time duration to said total time factor; and computer readable means for dynamically computing a duration of said at least one of said plurality of segments as an actual time duration based on said percentage of said actual time duration.

18. A computer program product recorded on computer readable medium for defining durations of segments of a motion path, comprising:

computer readable means for dividing the motion path into a plurality of segments;

computer readable means for assigning time factors to less than all of the plurality of segments by assigning a number of clock ticks to said less than all of the plurality of segments; and computer readable means for assigning a total time factor for the motion path.

19. The program product of claim 18, wherein said computer readable means for assigning at least a first time factor comprises:

after assigning said total time factor, computer readable means for dynamically computing said at least a first time factor based on user assigned percentages of said total time factor.

20. The program product of claim 18, wherein said computer readable means for assigning at least a first time factor comprises:

after assigning said total time factor an actual time duration, computer readable means for dynamically computing any remaining segment duration times after assigning an actual time duration for said at least one of said plurality of segments.

21. The program product of claim 18, wherein said computer readable means for assigning at least a first time factor comprises:

after assigning an actual duration of time for said at least a first time factor for said at least one of said plurality of segments, computer readable means for dynamically computing said total time factor as a sum of said plurality of segments.

* * * * *